United States Patent [19]
Akita

[11] 3,978,954
[45] Sept. 7, 1976

[54] COIL SPRING TYPE OVER-COVER CLUTCH

[75] Inventor: Minoru Akita, Osaka, Japan

[73] Assignee: Kabushiki Kaisha Daikin Seisakusho, Osaka, Japan

[22] Filed: July 14, 1975

[21] Appl. No.: 595,878

[30] Foreign Application Priority Data
July 22, 1974  Japan............................ 49-87418

[52] U.S. Cl............................. 192/89 R; 192/70.29; 267/169
[51] Int. Cl.²......................................... F16D 13/44
[58] Field of Search............ 192/89 R, 70.27, 70.29; 267/615, 169

[56] References Cited
UNITED STATES PATENTS
3,489,255  1/1970  Gatewood....................... 192/70.29

FOREIGN PATENTS OR APPLICATIONS
1,303,564  8/1962  France............................. 192/70.29
1,600,056  1/1970  Germany........................ 192/70.27

Primary Examiner—Benjamin W. Wyche
Attorney, Agent, or Firm—Pierce, Scheffler & Parker

[57] ABSTRACT

The invention provides an improved means for preventing deformation and slipping-off of a coil spring-type over-cover clutch by incorporating in the clutch a novel cylindrical spring cap.

2 Claims, 3 Drawing Figures

COIL SPRING TYPE OVER-COVER CLUTCH

In recent years, engine power and speed have increased with an increase in speed in transportation. Consequently, in a coil spring-type over-cover clutch, possibility of troubles developing — such as slipping-off and deformation of said coil spring — has become greater due to an increase in centrifugal force.

It is an object of this invention to solve the above-mentioned troubles, and the invention relates to the provision of means of preventing slipping-off and deformation.

The invention will now be described in detail, and with reference to the accompanying drawing, in which FIG. 1 is a vertical sectional view of a clutch embodying this invention;

Figure 1:
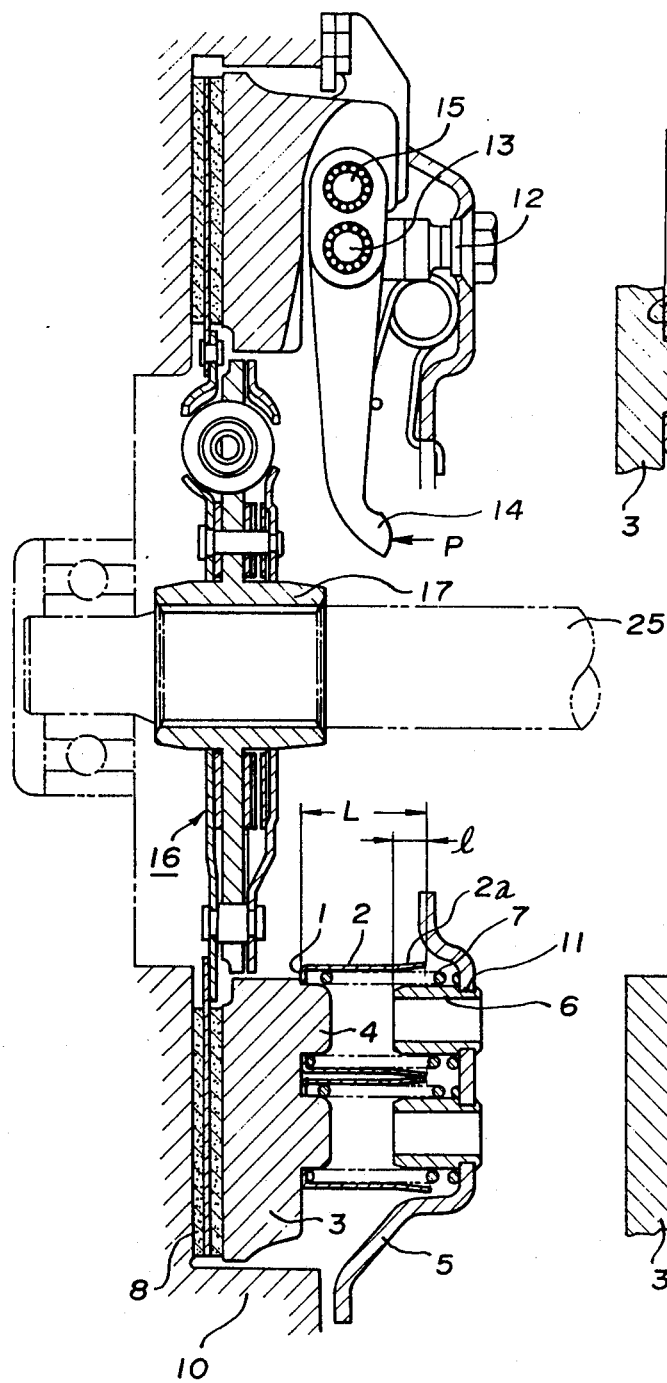

In over-all aspect the invention is concerned with the improvement of a coil spring-type over-cover clutch by the incorporation thereinto of a novel deformation and slipping-off means in which a cylindrical spring cap 2 is provided with an inward flange 1 at one end thereof, said flange 1 being fitted in a projection 4 of a pressure plate 4 of a pressure plate 3, a coil spring 7 coaxial with said projection 4 and a spring support 6 fixed to a clutch cover 5 is depressingly assembled between the flange 1 and the clutch cover 5. Lengths of said spring support 6 and of spring cap 2 are designed and selected in such a way (1) that the spring cap 2 does not interfere with the clutch cover 5 even in the maximum released condition of the clutch, and (2) that the spring support 6 is securely inserted within the spring cap 2 even under the maximum worn-out state of a clutch facing 8.

The clutch cover 5 is bolted to a flywheel 10 fixed to an output shaft of an engine (e.g., internal combustion engine), the spring support 6 being fixed to the clutch cover 5 by caulking at a part 11. The clutch is provided with, for example, three release levers 14. Release lever 14 is supported on a pin 13 secured to a stud belt 12 fixed to the clutch cover 5, a pressure plate 3 being held with a pin 15 to the radial outer end of the release lever 14. A friction facing 8 assembled between the pressure plate 3 and the flywheel 10 is fitted to an outer periphery of a clutch disk 16, a spline hub 17 at the center of the clutch disk being fitted in a clutch shaft 25.

Figure 2:
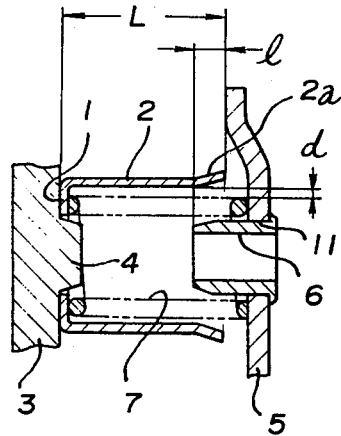
FIG. 2 is a partially enlarged view of FIG. 1.

A tip end 2a of the spring cap 2 (shown in FIG. 1 and FIG. 2) diverges in a slight taper, and the spring cap 2 is inserted into the spring support 6 so as to be overlapping each other by a length $l$ between the clutch is engged as shown in the figure.

In the clutch-engaged condition shown in the figure, the coil spring 7 pushes forth the pressure plate 3 to the left, the facing 8 is depressingly sandwiched between the pressure plate 3 and the flywheel 10, engine power reached at the flywheel 10 is transmitted through the facing 8 to the clutch disk 16 and is led through the spline hub 17 to the clutch shaft 25. In a clutch-released condition with a clutch pedal being stepped on, a releasing force $P$ is applied on the tip end (radial) inner end) of the release lever 14 toward the left, the release lever is swung with the pin 13 at it supporting point, and the pressure plate 3 is drawn apart from the facing 8 through the pin 15 toward the right in the figure. The spring cap 2 moves to the side of the clutch cover 5 (to the right) together with the pressure plate 3 during this clutch releasing period, and a length $L$ of the spring cap 2 is so engineered that the tip end of the cap 2 does not strike against and interfere with the clutch cover 5 even under the maximum clutch released condition.

With an increase in wear of the facing 8, the position of the pressure plate 3 under the clutch-engaged condition is shifted to the left by a length equivalent to the wear of the facing. Naturally, the length $L$ of the spring cap 2 and a length of the support 6 are predetermined in such a way that the tip end 2a of the cap 2 does not slip off from the support 6, i.e. the length $l$ does not come to 0, even under the maximum allowable worn-out condition of the facing 8.

In the embodiment shown in the figure, a clearance of about $d = 1$ mm (FIG. 2) is provided between the inside of the cap 2 and the outside of the coil spring 7.

Figure 3:
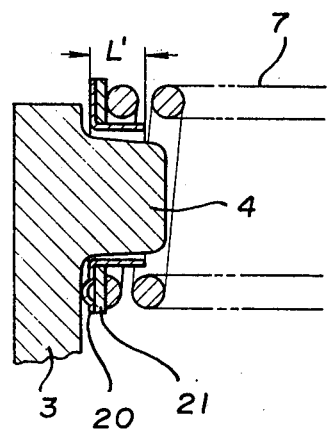
FIG. 3 is a sectional view of a conventional clutch.

An example of conventional means is illustrated in FIG. 3, in which a short spring seat 20 and an insulator 21 are used in place of the spring cap 2 deviced in this invention. In FIG. 3, a length $L$ of the spring seat 20 is short so that the spring seat 20 is only supporting a short range of the left end of the coil spring 7. Consequently, when a radial centrifugal force is applied on the coil spring 7 caused by an increase in the engine speed, the center portion of the coil spring 7 considerably stretches toward outside to be deformed, and further the coil spring 7 might slip off from the spring seat 20 at a critical moment. As mentioned above, the trouble due to slippingoff of the coil spring 7 caused by the centrifugal force becomes greater with an increase in the engine speed.

In accordance with the present invention, however, the coil spring 7 (FIG. 1) is guarded by arranging the cylindrical spring cap 2 around its peripheral surface and across for about whole length thereof with the clearance $d$ provided between them, so that, even when a large centrifugal force is applied on the coil spring 7, the central deformation of the spring is securely held by the cap 2, and further the cap 2 and the support 6 are overlapping each other by the length $l$. Therefore, there is no possibility of slipping-off of the cap 2 from the projection 4. The spring cap 2 is applied an elastic force of the coil spring 7 at its inward flange 1 to be depressingly contacted against the pressure plate 3, so that there is little chance of the flange 1 being lifted from the pressure plate 3 even when the centrifugal force is increased. Even in case of the clutch shaft side part of the flange being lifted, the support 6 is inserted into the tip end 2a of the cap 2 by the length $l$ so that there is little possibility that the cap 2 is inclined more than a fixed value. As mentioned above the deformation of the coil spring 7 is securely prevented by the spring cap 2 and the support 6, so that the elastic force by which the coil spring 7 depresses the pressure plate 3 toward the left is kept constant to eliminate a possibility of slipping of the facing 8 in a high speed running of the clutch.

This invention provides means which can be easily embodied as described above, having the feature of securely preventing deformation and slipping-off of the coil spring even in high speed running.

Incidentally, in embodying this invention, wear of the spring cap 2 can be limited to a minimum and hysteresis characteristic of the clutch operational force in the high speed running can be kept to a minimum as far as possible, even when the coil spring 7 is seated on the inside of the cap 2 due to the centrifugal force, by carburizing the spring cap 2 and especially by improving a hardness and smoothness of the inside surface thereof. It goes without saying that the insulator shown in FIG. 3 may be fitted between the inward flange 1 of the cap 2 and coil spring 7.

I claim:

1. A deformation and slipping-off prevention means of spring incorporated in a coil spring type over-cover clutch comprising a cylindrical spring cap two having an inward flange one at one end thereof, said flange one being fitted around in a projection four of a pressure plate three, a coil spring seven coaxial with said projection four and a spring support six fixed to a clutch cover five being assembled between the flange one and the clutch cover five, and the lengths of said spring support six and spring cap two being such that the spring cap two does not interfere with the clutch cover five even in the maximum released condition of the clutch and that the spring support six is securely inserted within the spring cap two even under the maximum worn out state of a clutch facing eight.

2. A deformation and slipping-off prevention means of spring incorporated in a coil spring type over-cover clutch defined in claim 1, in which said spring cap two is carburized to improve a hardness and smoothness at least of the inside surface thereof.

* * * * *